US011179600B2

(12) United States Patent
Hiemann et al.

(10) Patent No.: US 11,179,600 B2
(45) Date of Patent: Nov. 23, 2021

(54) METHOD FOR CALCULATING A POSITION OF AN ATHLETE ON A SPORTS FIELD

(71) Applicant: SWISS TIMING LTD, Corgemont (CH)

(72) Inventors: Alexander Hiemann, Leipzig (DE); Thomas Kautz, Leipzig (DE)

(73) Assignee: SWISS TIMING LTD, Corgemont (CH)

( * ) Notice: Subject to any disclaimer, the term of this patent is extended or adjusted under 35 U.S.C. 154(b) by 0 days.

(21) Appl. No.: 16/387,582

(22) Filed: Apr. 18, 2019

(65) Prior Publication Data
US 2019/0381354 A1 Dec. 19, 2019

(30) Foreign Application Priority Data

Jun. 14, 2018 (EP) .................................. 18177811

(51) Int. Cl.
*A63B 24/00* (2006.01)

(52) U.S. Cl.
CPC .. *A63B 24/0021* (2013.01); *A63B 2024/0025* (2013.01); *A63B 2220/13* (2013.01); *A63B 2220/40* (2013.01); *A63B 2220/807* (2013.01); *A63B 2220/836* (2013.01)

(58) Field of Classification Search
CPC ........ A63B 2024/0025; A63B 2220/13; A63B 2220/40; A63B 2220/807; A63B 2220/836; A63B 24/0021; G01S 5/0263; G01S 5/16
See application file for complete search history.

(56) References Cited

U.S. PATENT DOCUMENTS

| | | | | |
|---|---|---|---|---|
| 5,513,854 A | * | 5/1996 | Daver | A63B 24/0003 348/157 |
| 6,710,713 B1 | * | 3/2004 | Russo | A63B 24/0021 340/573.1 |
| 7,139,582 B2 | * | 11/2006 | Couronne | A63B 24/0021 455/456.1 |

(Continued)

FOREIGN PATENT DOCUMENTS

| | | |
|---|---|---|
| KR | 10-2016-0134078 | 11/2016 |
| WO | WO 2011/116421 A1 | 9/2011 |

(Continued)

OTHER PUBLICATIONS

European Search report dated Dec. 17, 2018 in European Application 18177811.9, filed on Jun. 14, 2018 (with Written Opinion).

*Primary Examiner* — Seng H Lim
(74) *Attorney, Agent, or Firm* — Oblon, McClelland, Maier & Neustadt, L.L.P.

(57) ABSTRACT

A method for calculating the position of an athlete, referred to as target, on a sports field, including estimating an approximate position of the target using a radio-based positioning system, the system including tracking sensors attached to several athletes on the sports field and antennas installed around the sports field, defining a search space around the approximate position, detecting an athlete in the search space using an optical-based positioning system, the system including cameras installed above and/or around the sports field and image recognition device, determining an accurate position of the detected athlete, attributing the accurate position to the target.

13 Claims, 5 Drawing Sheets

(56) References Cited

U.S. PATENT DOCUMENTS

| | | | |
|---|---|---|---|
| 7,327,383 B2* | 2/2008 | Valleriano | H04N 1/32101 348/143 |
| 8,628,453 B2* | 1/2014 | Balakrishnan | A63B 71/0686 482/1 |
| 9,684,826 B2* | 6/2017 | Dubuque | G06K 9/6288 |
| 2003/0049590 A1* | 3/2003 | Feldbau | A63B 71/0605 434/251 |
| 2003/0095186 A1* | 5/2003 | Aman | H04N 5/232 348/162 |
| 2003/0138146 A1* | 7/2003 | Johnson | G06K 9/00 382/190 |
| 2004/0171388 A1* | 9/2004 | Couronne | G01S 5/06 455/456.1 |
| 2005/0143199 A1* | 6/2005 | Saroyan | A63B 71/0605 473/438 |
| 2005/0202905 A1* | 9/2005 | Chesser | A63B 24/0021 473/415 |
| 2008/0002031 A1* | 1/2008 | Cana | H04N 5/23206 348/208.14 |
| 2010/0184564 A1* | 7/2010 | Molyneux | A63B 71/0605 482/1 |
| 2011/0304497 A1* | 12/2011 | Molyneux | H01Q 1/273 342/42 |
| 2014/0192204 A1* | 7/2014 | Glazer | H04N 5/23218 348/169 |
| 2014/0266160 A1* | 9/2014 | Coza | G01V 3/08 324/207.11 |
| 2015/0138384 A1 | 5/2015 | Kennedy et al. | |
| 2015/0138427 A1 | 5/2015 | Kennedy et al. | |
| 2015/0247912 A1 | 9/2015 | Tang et al. | |
| 2015/0375083 A1* | 12/2015 | Stelfox | A63F 13/65 700/91 |
| 2016/0086029 A1* | 3/2016 | Dubuque | G06K 9/00979 382/159 |

FOREIGN PATENT DOCUMENTS

| | | |
|---|---|---|
| WO | WO 2015/073916 A2 | 5/2015 |
| WO | WO 2016/205951 A1 | 12/2016 |

* cited by examiner

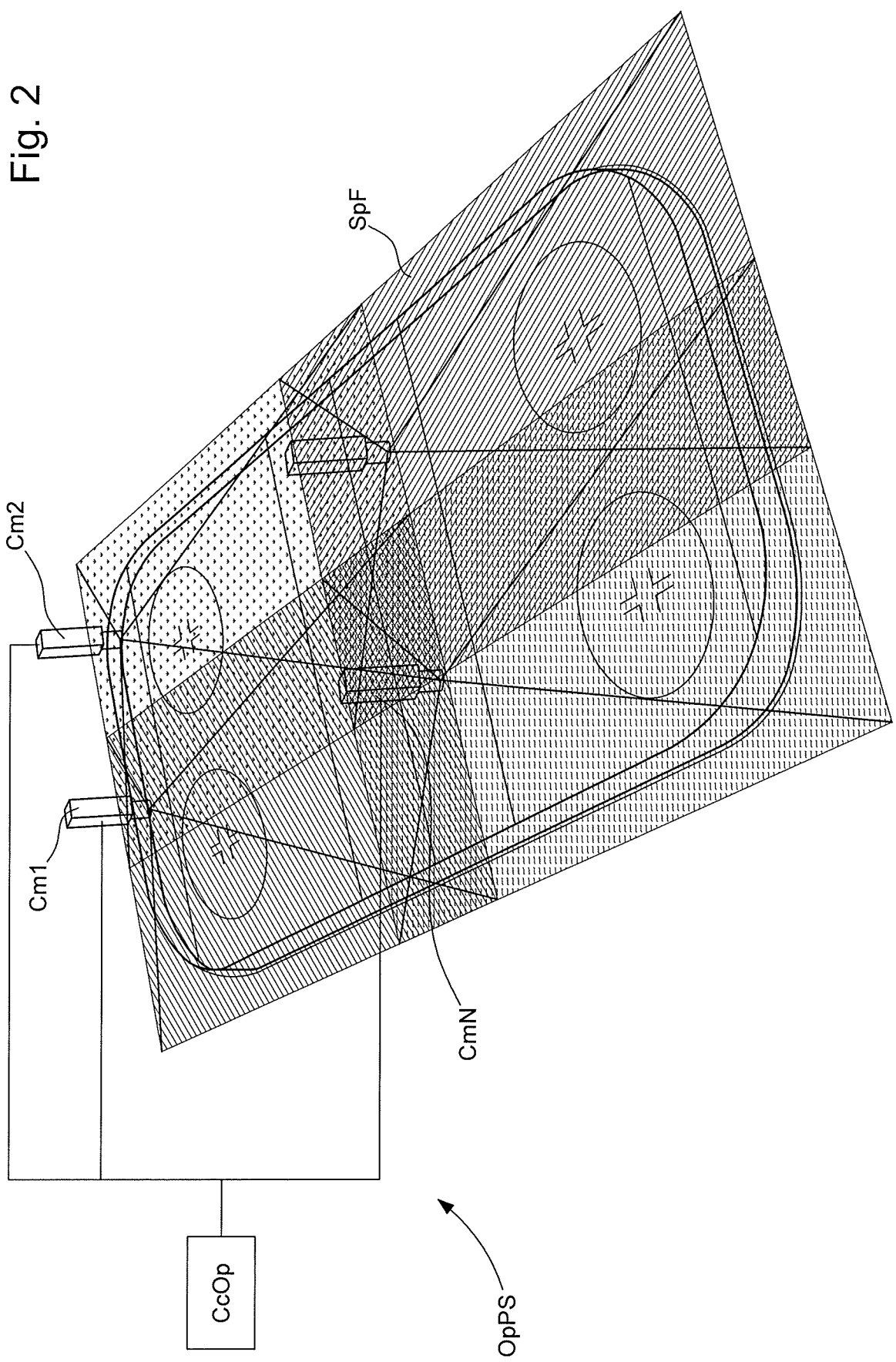

METHOD FOR CALCULATING A POSITION OF AN ATHLETE ON A SPORTS FIELD

CROSS-REFERENCE TO RELATED APPLICATION

This application claims priority to European Patent Application No. 18177811.9 filed on Jun. 14, 2018, the entire disclosure of which is hereby incorporated herein by reference.

FIELD OF THE INVENTION

The invention relates to the field of measurement and analysis of the trajectories of athletes on a sports field, during a sports event.

BACKGROUND OF THE INVENTION

In recent years, there has been an increasing demand for reliable and objective evaluation of sport specific data. The measurement and analysis of the trajectories of athletes is one possible approach to gain such insights. It allows the assessment of the physical performance and tactical behaviour of athletes. Thus, it can yield helpful feedback for athletes, coaches and referees. Furthermore, spectators can be supplied with additional information about the accomplishments of their idols.

Position tracking systems provide a means for the measurement of athletes' positions and motion trajectories. State-of-the-art systems comprise optical- and radio-based tracking. Optical tracking enables position measurements with a high accuracy and stability, and may provide context information. However, one of the most challenging problems with optical tracking is the correct assignment of tracking data to the respective athletes. On the contrary, radio-based tracking enables explicit assignments of the position data to the athletes. However, a problem of radio-based systems is the quality and the accuracy of positioning.

SUMMARY OF THE INVENTION

It is an object of the invention to overcome the weaknesses of the aforementioned tracking approaches, and in particular to provide a method for tracking an athlete (referred to as target) on a sports field, including the correct identification of the target among several athletes being simultaneously tracked, and the correct position data assignment to the target.

Hence, the invention relates to a method according to claim 1.

The term "radio-based" refers to position calculation using distance or angle-of-arrival measurements between tracking sensor and antennas The method overcomes the drawbacks of optical- and radio-based tracking approaches by combining them. According to the invention, information from the radio-based positioning system and the optical-based positioning system can be fused on a low level, in contrast to some state-of-the-art methods where the positions given by an optical- and a radio-based system may be combined afterwards. The imprecise position of the target given by the radio-based positioning system is used to limit the search space for the optical-based positioning, thus reducing complexity of the calculations. Hence, the method according to the invention has two essential advantages:

A hierarchical complexity reduction using multimodal tracking technologies

An explicit, unambiguous assignment of position measurements to athletes.

Furthermore, the method according to the invention may comprise one or a combination of the characteristics of claims 2 to 10.

BRIEF DESCRIPTION OF THE DRAWING

Other features and advantages of the present invention will appear more clearly upon reading the following detailed description, made with reference to the annexed drawings, given by way of non-limiting example:

FIG. 2 shows said sports field, equipped with an optical-based positioning system comprising cameras located above the field FIG. 3($a$), FIG. 3($b$) and FIG. 3($c$) show said sport field, equipped an alternative optical-based positioning system comprising cameras located above and around the field FIG. 4($a$) shows a step of estimating an approximate position of a target on said sports field, according to the invention FIG. 4($b$) shows a step of defining a search space around said approximate position, according to the invention FIG. 4($c$) shows a step of detecting and determining an accurate position of an athlete in said search space, according to the invention

DETAILED DESCRIPTION OF THE PREFERRED EMBODIMENTS

The method according to the invention for calculating the position of a moving athlete—called target—on a sports field requires using a radio-based positioning system RdPS and an optical-based positioning system OpPS.

Figure 1:
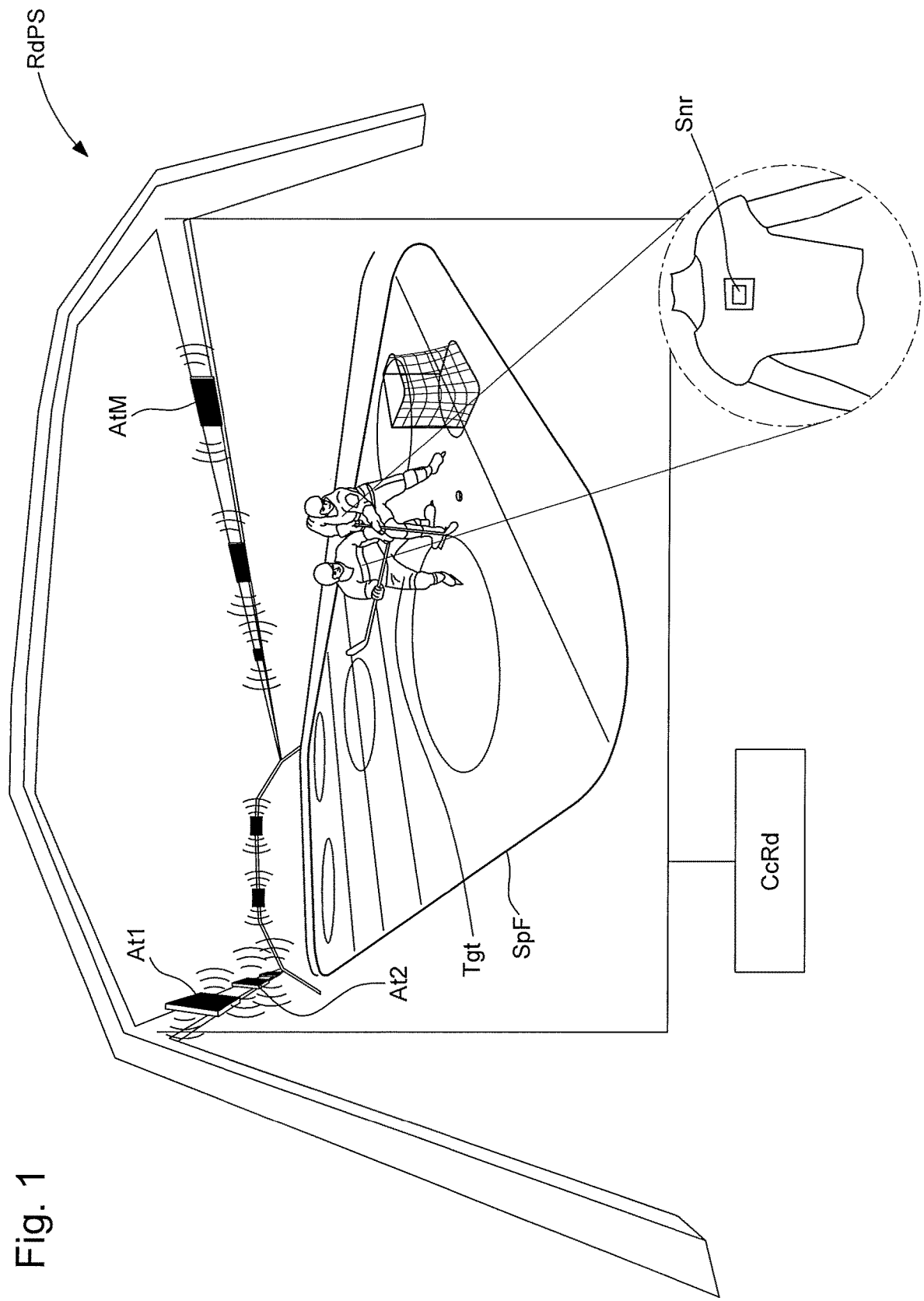
FIG. 1 shows a sports field equipped with a radio-based positioning system

As illustrated in FIG. 1, the radio-based positioning system RdPS comprises a set of distributed antennas At1, At2 . . . AtM located around the sport field SpF, capable of receiving radio frequency signals transmitted by tracking sensors Snr. Said tracking sensors Snr are attached to the athletes present on the sports field SpF, including the target Tgt. Possible options of attachment of the tracking sensors include the athletes' gear (for example protective gear in sports like ice hockey), the athletes' clothes (for example jerseys), and additional gear designed for this purpose (for example separate chest straps). The position determination of an athlete may be carried out by distance measurements or angle-of-arrival measurements between the tracking sensor attached to said athlete and the antennas. The particular measurements between an attached sensor and the distributed antennas are used by a calculation unit CcRd of the radio-based positioning system RdPS to calculate the position of the sensor.

In an embodiment, the athletes carry inertial measurement units. This way, additional measurements such as acceleration, inclinations and angular rates can be recorded using the installed set of antennas At1, At2 . . . AtM.

As illustrated in FIG. 2, the optical-based positioning system OpPS comprises a set of distributed, calibrated and synchronised cameras Cm1, Cm2 . . . CmN located above.

Figure 3A:
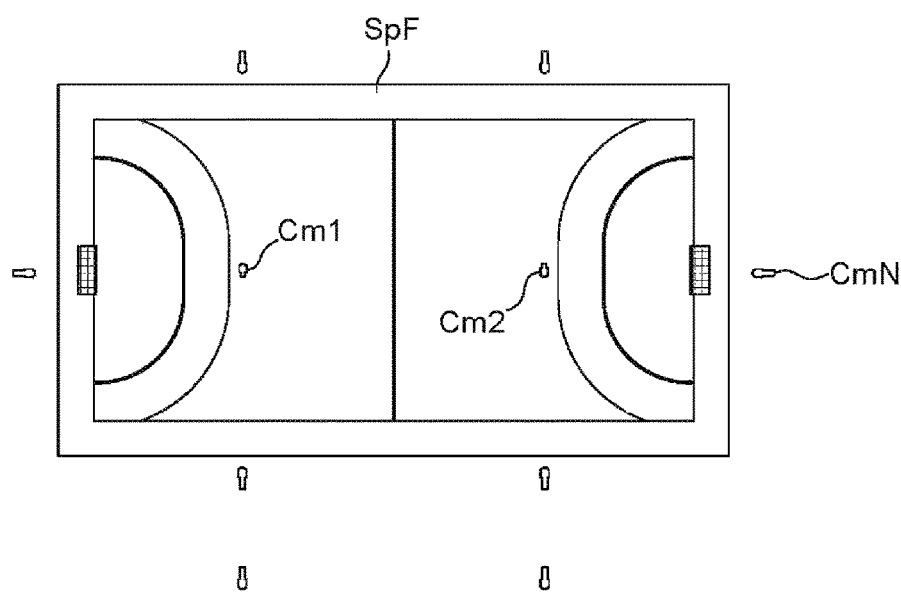
Figure 3B:
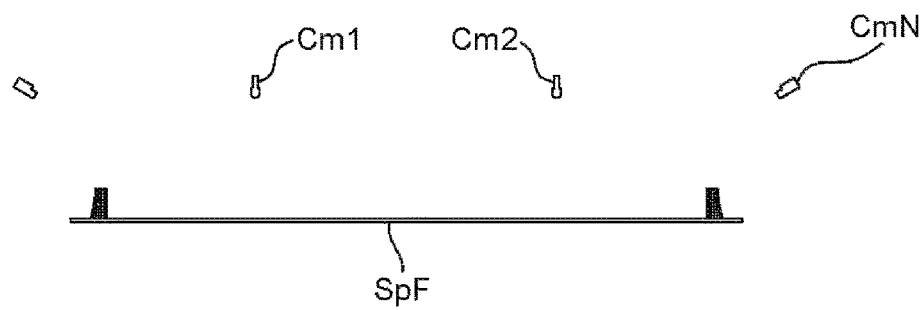
Figure 3C:
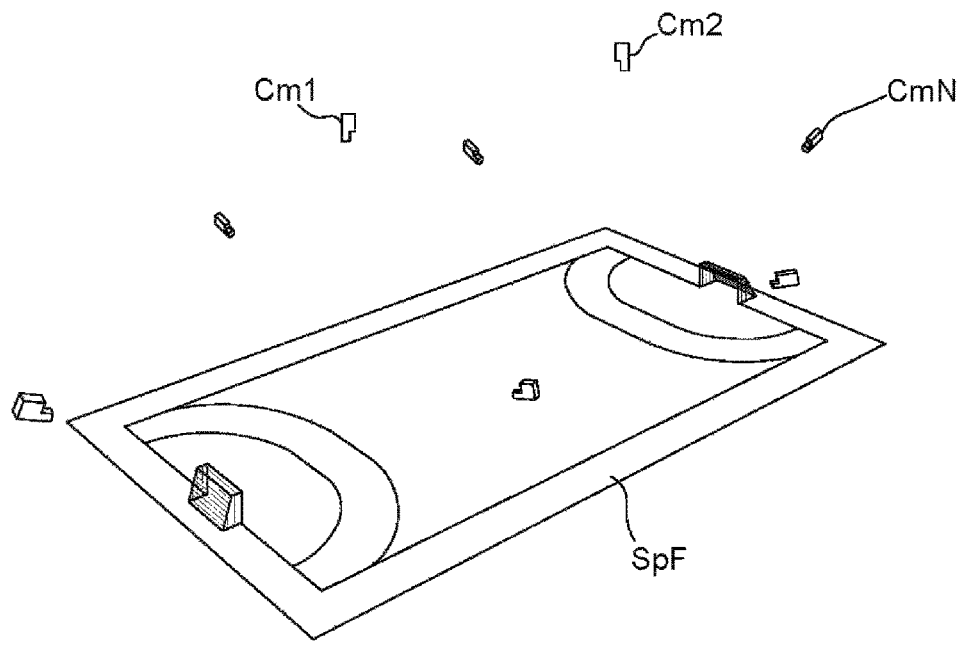

In an alternative embodiment shown in FIG. 3(a), FIG. 3(b) and FIG. 3(c), the cameras Cm1, Cm2 . . . CmN are located both above and around the sports field. Images are gathered from different perspectives such that the camera setup completely captures the sports field. Beside the cameras located above and/or around the sports field, using additional peripheral cameras is possible. All cameras are managed by a camera controller CcOp of the optical-based positioning system OpPS. The detection of athletes in images may be implemented using traditional image recognition approaches. Another powerful detection approach is the application of machine learning algorithms that learn recognition rules and features from provided reference data. Recognition algorithms allow for a detailed semantic segmentation of the athletes, which is a source of additional information.

Figure 6:
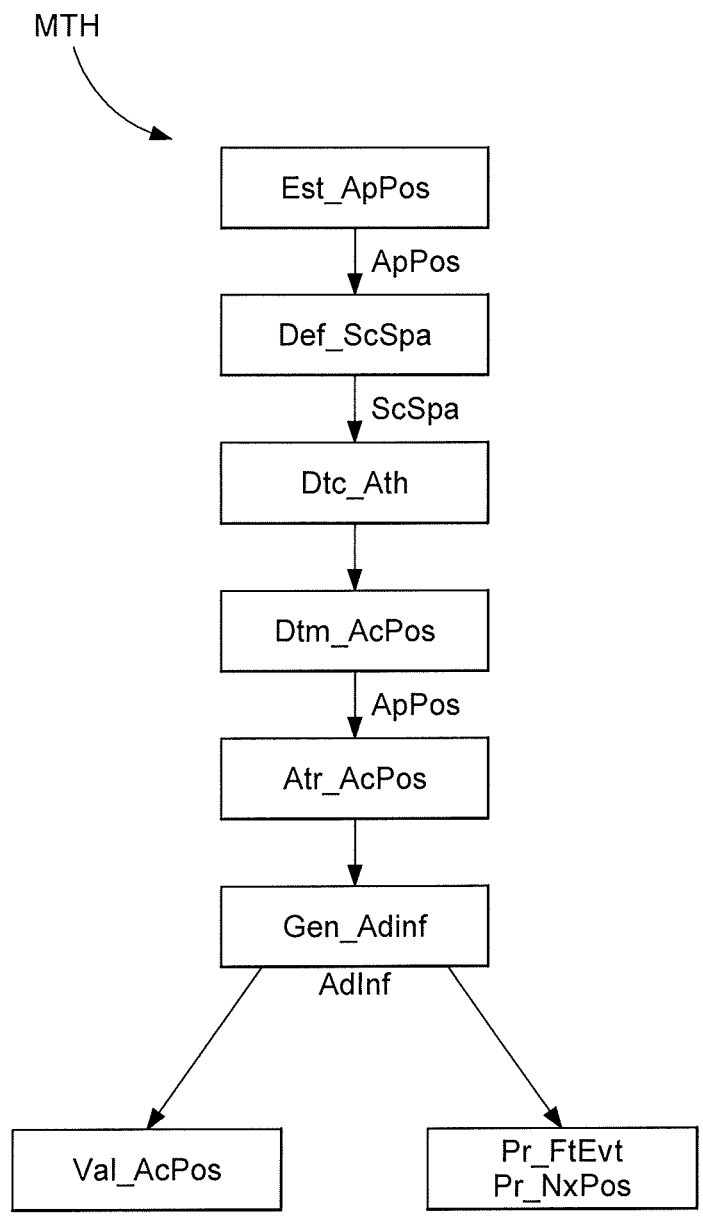
FIG. 6 shows steps of a method according to the invention.

The method MTH according to the invention comprises the following steps, illustrated in FIG. 6.

Figure 4A:
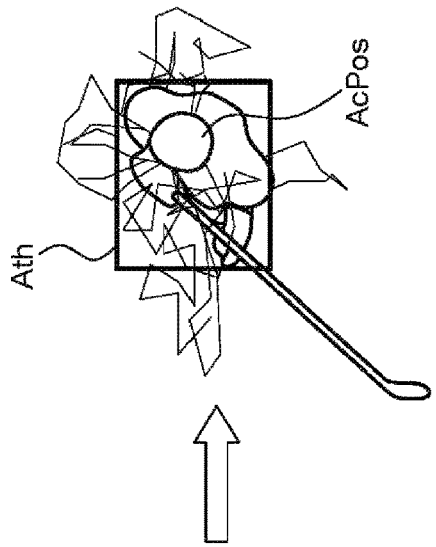

In a step Est_ApPos, with reference to FIG. 4(a), an approximate position ApPos of the target Tgt is estimated using the radio-based positioning system RdPS. The approximate position may be determined using angle measurements between the tracking sensor attached to the target and installed antennas of the radio-based positioning system. The approximate position may alternatively be determined using distance measurements between the tracking sensor and the antennas (this is originally referred to as ranging-based positioning).

Figure 4B:
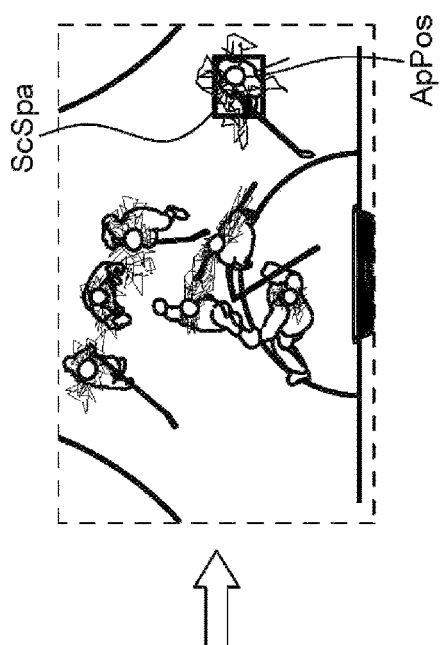

In a step Def_ScSpa, with reference to FIG. 4(b), a search space ScSpa is defined around said approximate position. This way, the approximate position ApPos of the target Tgt from the radio-based positioning system is used to limit the search space for consequent calculations. This results in a reduced computational effort and a simplification of detection techniques.

Figure 4C:
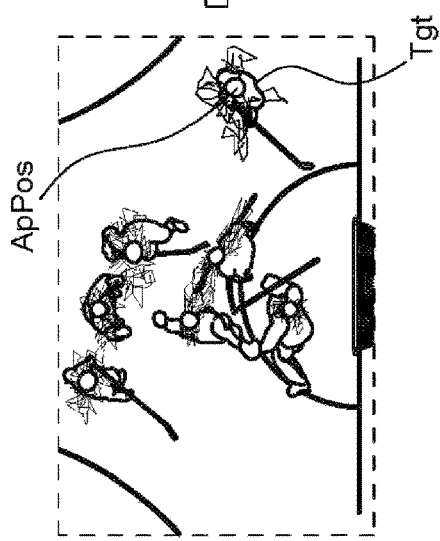

In a step Dtc_Ath, with reference to FIG. 4(c), an athlete Ath is detected in said search space ScSpa using the optical-based positioning system OpPS. As explained in the previous paragraph, image recognition algorithms are limited to the predefined region of interest (search space ScSpa) in order to reduce the calculations. The box shown on FIG. 4(c) shows the result of the detection of an athlete's body.

In a step Dtm_AcPos, as illustrated in FIG. 4(c), an accurate and precise position AcPos of said detected athlete Ath is determined.

In a step Atr_AcPos, the accurate position AcPos is attributed to the target Tgt.

Modern machine learning based recognition algorithms are able to carry out object detection and localization in real time. The main shortcoming of these algorithms is that they are not able to unambiguously identify the respective athlete. In contrast, the position data gathered from radio-based positioning allows for an explicit allocation of the position data of an attached sensor to the target (signals received from multiple sensors can be discriminated by the radio-based positioning system RdPS and the assignment of a sensor to an athlete is defined by the user). Thanks to the method of the invention, accurate positions gathered from optical-based positioning can be assigned to their matching position gathered from radio-based positioning. Thus, an unambiguous allocation of the accurate position measurements to the correct athletes is possible.

In addition, the method MTH may comprises the following steps.

Figure 5:
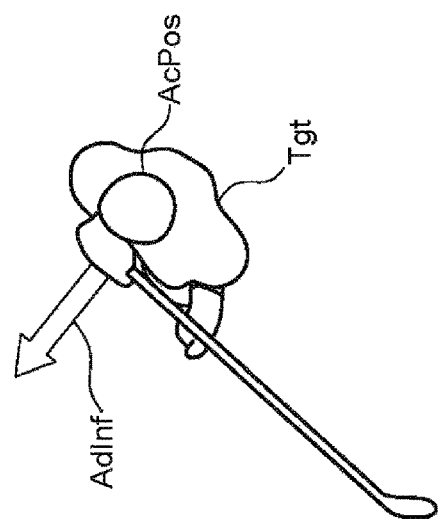
FIG. 5 shows a step of generating additional information regarding said detected athlete, according to the invention

In a step Gen_AdInf, with reference to FIG. 5, additional information AdInf on the target Tgt is generated using at least one inertial measurement unit attached to said target and/or the optical-based positioning system OpPS. Such an additional information may be the acceleration of the target, their pose, their orientation, the orientation of their racket or stick, etc.

In a step Val_AcPos, the additional information AdInf gathered from the optical-based positioning system OpPS and/or from the inertial measurement unit(s) is used to complement and validate the information from the radio-based positioning system. Information about additional objects, such as rackets or sticks, and a detailed analysis of the target may result in a higher position accuracy that are not available only with a radio-based positioning method.

In a step Pr_NxPos, respectively Pr_FtEvt, the additional information AdInf gathered from the optical-based positioning system OpPS and/or from the inertial measurement unit(s) is used to predict a next position NxPos of the target Tgt, respectively a future event FtEvt (for instance, the target is going to use their racket or stick).

Of course, the present invention is not limited to the illustrated example but may be subject to various variants and alterations, which will be apparent to those skilled in the art.

The invention claimed is:

1. A method for calculating a position of an athlete, referred to as a target, on a sports field, comprising:
    estimating an approximate position of the target using a radio-based positioning system, the radio-based positioning system comprising tracking sensors attached to several athletes on the sports field and antennas installed around the sports field,
    defining boundaries of a search space, as a first bounded region, around the estimated approximate position such that the estimated approximate position lies within the first bounded region,
    detecting, within the first bounded region, a second bounded region enclosing a body of the athlete by applying an image recognition algorithm only to the first bounded region corresponding to the defined search space, the first bounded region being defined within one or more images obtained using an optical-based positioning system, the optical-based positioning system comprising cameras installed at least one of above and around the sports field, the first bounded region being smaller than a view region of any particular camera in the optical-based positioning system, and being based only on the estimated approximate position,
    determining an updated position of the athlete within the detected second bounded region, and
    attributing the updated position to the target instead of the estimated approximate position.

2. The method according to claim 1, wherein the radio-based positioning system is based on time of arrival measurements.

3. The method according to claim 1, wherein the radio-based positioning system is based on time difference of arrival.

4. The method according to claim 1, wherein the radio-based positioning system is based on angle of arrival measurements.

5. The method according to claim 1, further comprising generating additional information on the target using at least one of an inertial measurement unit attached to the target and the optical-based positioning system.

6. The method according to claim 5, further comprising predicting a next position of the target or a future event using the additional information.

7. The method according to claim 5, further comprising validating the accurate position of the target using the additional information.

8. The method according to claim 5, wherein the additional information comprises an acceleration of the detected athlete.

9. The method according to claim 5, wherein the additional information comprises an orientation of the detected athlete.

10. The method according to claim 5, wherein the additional information comprises a pose of the detected athlete.

11. The method of claim 1, further comprising:
determining, using the image recognition algorithm applied to the first bounded region, a position of an object used by the athlete to perform actions on the sports field.

12. A method for calculating a position of an athlete, referred to as target, on a sports field, comprising:
estimating an approximate position of the target using a radio-based positioning system, the radio-based positioning system comprising tracking sensors attached to several athletes on the sports field and antennas installed around the sports field,
defining boundaries of a search space around the estimated approximate position,
detecting, within the first bounded region, a second bounded region enclosing a body of the athlete by applying an image recognition algorithm only to a search region corresponding to the defined search space, the search region being defined within one or more images obtained using an optical-based positioning system, the optical-based positioning system comprising cameras installed at least one of above and around the sports field, the search region being different from a view region of any particular camera in the optical-based positioning system, and being based only on the estimated approximate position,
determining an updated position of the athlete within the detected second bounded region,
attributing the updated position to the target instead of the estimated approximate position,
determining a position of an object used by the athlete, and
predicting a future use of the object by the athlete.

13. The method of claim 11, further comprising predicting a future use of the object by the athlete.

* * * * *